(12) United States Patent
Ohmae et al.

(10) Patent No.: US 9,792,253 B2
(45) Date of Patent: Oct. 17, 2017

(54) SENSOR DEVICE, SENSOR MANAGEMENT SYSTEM, METHOD FOR CONTROLLING SENSOR DEVICE, AND COMPUTER-READABLE RECORDING MEDIUM

(75) Inventors: Soji Ohmae, Kyoto (JP); Masahiro Ikumo, Kyoto (JP); Akane Nakashima, Shiga (JP); Ryota Akai, Kyoto (JP); Akira Nakajima, Shiga (JP)

(73) Assignee: OMRON Corporation, Kyoto (JP)

( * ) Notice: Subject to any disclaimer, the term of this patent is extended or adjusted under 35 U.S.C. 154(b) by 1048 days.

(21) Appl. No.: 13/816,524

(22) PCT Filed: Mar. 16, 2011

(86) PCT No.: PCT/JP2011/056254
§ 371 (c)(1),
(2), (4) Date: Feb. 12, 2013

(87) PCT Pub. No.: WO2012/042932
PCT Pub. Date: Apr. 5, 2012

(65) Prior Publication Data
US 2013/0144562 A1 Jun. 6, 2013

(30) Foreign Application Priority Data
Oct. 1, 2010 (JP) .................................. 2010-223906

(51) Int. Cl.
*G06F 17/00* (2006.01)
*G01D 21/00* (2006.01)
*G01D 9/00* (2006.01)

(52) U.S. Cl.
CPC ............. *G06F 17/00* (2013.01); *G01D 21/00* (2013.01); *G01D 9/00* (2013.01)

(58) Field of Classification Search
CPC ....................................................... G06F 17/00
(Continued)

(56) References Cited

U.S. PATENT DOCUMENTS

| 6,460,005 B1 * | 10/2002 | Chang ................. G06F 11/3058 |
| | | 702/130 |
| 2004/0133387 A1 | 7/2004 | Volkel |

(Continued)

FOREIGN PATENT DOCUMENTS

| JP | 2006-340157 A | 12/2006 |
| JP | 2008-52415 A | 3/2008 |
| WO | 03/007099 A1 | 1/2003 |

OTHER PUBLICATIONS

International Search Report issued in PCT/JP2011/056254 mailed Jun. 7, 2011 (3 pages).

(Continued)

*Primary Examiner* — Ricky Ngon
(74) *Attorney, Agent, or Firm* — Osha Liang LLP

(57) ABSTRACT

A sensor device has a difference calculation unit that calculates the difference between a predetermined threshold and a current measured value measured by a sensor unit that measures a measurement subject, a change amount recording unit that records the maximum amount of change of the measured value with respect to elapsed time on the basis of a plurality of measured value history records obtained by measuring the measurement subject, and a minimum time calculation unit that calculates the minimum arrival time that is the minimum time for the measurement subject to arrive at the predetermined threshold from the current measured value on the basis of the calculated difference and the recorded maximum amount of change.

13 Claims, 10 Drawing Sheets

(58) Field of Classification Search
USPC .......................................................... 702/189
See application file for complete search history.

(56) References Cited

U.S. PATENT DOCUMENTS

2008/0068254 A1* 3/2008 Tsunehara ............... G01S 1/026
                                                                    342/125
2009/0121867 A1* 5/2009 Park ..................... G01S 5/0252
                                                                  340/539.32

OTHER PUBLICATIONS

Extended European Search Report in countepart European Application No. 11 82 8496.7 issued Oct. 5, 2016 (8 pages).

* cited by examiner

Next Measurement With Certain Timing On The Basis Of Experience Or Know-How Of Persons Next Measurement With Timing Based On History Record In The Past

SENSOR DEVICE, SENSOR MANAGEMENT SYSTEM, METHOD FOR CONTROLLING SENSOR DEVICE, AND COMPUTER-READABLE RECORDING MEDIUM

BACKGROUND

Technical Field

The present invention relates to, e.g., a sensor device for measuring a measurement subject, and a management system including a sensor device and a server device for managing the sensor device.

Background Art

In our surrounding environment, various kinds of sensors are installed, and measurement data with a sensor are collected and analyzed by a server device (or a main body device). Then, using this analysis result, devices and the like installed in the surrounding environment are controlled.

When one server device has many sensors to be managed, and the number of measurements and the number of data transmissions increase in the sensor, the server device has to accumulate and analyze a large amount of data, and the server device fails to process the data or reduces the processing performance.

When the sensor frequently measures and transmits data, the sensor naturally consumes more power. For example, when the sensor is operated on a battery, and the sensor frequently measures and transmits data, the lifetime of the battery is reduced, and it is necessary to frequently replace the battery. On the other hand, when the number of measurements is reduced, it may be impossible to appropriately control the devices and the like.

Accordingly, the power consumption is reduced by preventing useless measurement and transmission. For example, Patent Document 1 discloses the following technique. Two cycles T1 (long cycle) and T2 (short cycle) and two thresholds $\alpha 1$ and $\alpha 2$ ($\alpha 1 \geq \alpha 2$) are set as measurement cycles of the sensor. Then, when the current measurement cycle is T1, the measurement cycle is changed as follows. When the change rate $\alpha$ of the measurement data with the sensor is more than $\alpha 1$, the measurement cycle is changed to T2. When the current measurement cycle is T2, the measurement cycle is changed as follows. When the change rate $\alpha$ of the measurement data is less than $\alpha 2$, the measurement cycle is changed to T2. As described above, both of the immediacy and power consumption of the measurement are achieved.

Patent Document 2 discloses a technique, in which a measured value with a sensor and a target range value are compared, and when a predetermined change is found in a comparison result for a predetermined number of times continuously or for a predetermined continuous time (in an embodiment, in a case where the measured value is less than the target range value for three times continuously), the measurement cycle is changed or the operation of the device is stopped.

PATENT DOCUMENTS

Patent Document 1: Japanese Unexamined Patent Publication No. 2008-52415 (published on Mar. 6, 2008)
Patent Document 2: Japanese Unexamined Patent Publication No. 2006-340157 (published on Dec. 14, 2006)

SUMMARY OF THE INVENTION

However, in the technique of Patent Document 1, when a management range of a measured value (for example, between an upper limit value and a lower limit value) is set, measurement is done as follows. Even at a position away from an upper limit value and a lower limit value within the management range, the measurement is done with a short cycle if the change rate of the measurement data is high. Therefore, useless measurements increase.

In the technique of Patent Document 2, the measurement is done with a short cycle until a predetermined change can be found for a predetermined number of times continuously, and therefore, this increases the number of measurements, and the power consumption. Moreover, since the stop of the operation of the device is not executed until the predetermined change can be found for the predetermined number of times continuously, the device is unstable because the environment cannot be managed appropriately. Therefore, when it takes a lot of time for the environment to reflect the control since the control of the device is carried out, it is difficult to apply the technique of Patent Document 2.

One or more embodiments of the invention provides a sensor device, a sensor management system, and the like which can optimize the frequency of measurement and can contribute to appropriate control and reduction of power consumption.

A sensor device according to one or more embodiments of the present invention includes difference calculation means that calculates the difference between a predetermined threshold and a current measured value measured by a sensor unit that measures a measurement subject, a change amount recording unit that records the maximum amount of change of the measured value with respect to elapsed time on the basis of a plurality of measured value history records obtained by measuring the measurement subject, minimum time calculation means that calculates the minimum arrival time that is the minimum time for the measurement subject to arrive at the predetermined threshold from the current measured value on the basis of the calculated difference and the recorded maximum amount of change, measurement time determination means that determines the time of the next measurement of the measurement subject from whichever time is the greater of the calculated minimum arrival time and the minimum time interval at which the sensor device can measure, and sensor control means that controls the sensor unit in a manner so as to measure the measurement subject at the determined time.

According to one or more embodiments of the present invention, the minimum arrival time for the measured value to arrive at the predetermined threshold from the current measured value is calculated on the basis of the difference between the predetermined threshold and the current measured value of the sensor unit and the maximum amount of change of the measured value with respect to elapsed time on the basis of the multiple measured value history records. Then, the time of the next measurement of the measurement subject by the sensor unit is determined from whichever time is the greater of the minimum arrival time and the minimum time interval at which the sensor device can measure. At the determined time, the sensor unit measures the measurement subject.

When the current measured value and the predetermined threshold are greatly different from each other, i.e., when the current measured value is greatly different from the threshold, the minimum arrival time calculated from the measured value maximum amount of change with respect to elapsed time and this difference is increased. In this case, the time interval from the current time to the time of the next measurement is increased. In other words, when the difference is great, the measurement frequency is decreased.

On the other hand, when the difference is small, i.e., when the current measured value is close to the threshold, the minimum arrival time calculated from the maximum amount of change and the difference is decreased. In this case, the time interval from the current time to the time of the next measurement is decreased. In other words, when the difference is small, the measurement frequency is increased.

As described above, according to the configuration, on the basis of the difference between the predetermined threshold and the current measured value and the maximum amount of change of the measured value with respect to elapsed time on the basis of the measured value history record which is multiple measured values in the past, the measurement frequency can be changed, and the frequency of the measurement can be optimized. Therefore, useless measurement can be eliminated, and the power consumption can be reduced. In addition, the predetermined threshold is set as a threshold for controlling devices and the like controlled by the measured value measured by the sensor device, so that this can contribute to appropriate control of the devices and the like.

DETAILED DESCRIPTION

Embodiments, examples, and comparative examples of the present invention will be hereinafter explained with reference to drawings. In the embodiments, the examples, and the comparative examples, open/close control of a window in a house based on a temperature will be explained. However, the present invention is not limited thereto, and can be applied to various kinds of sensor devices. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
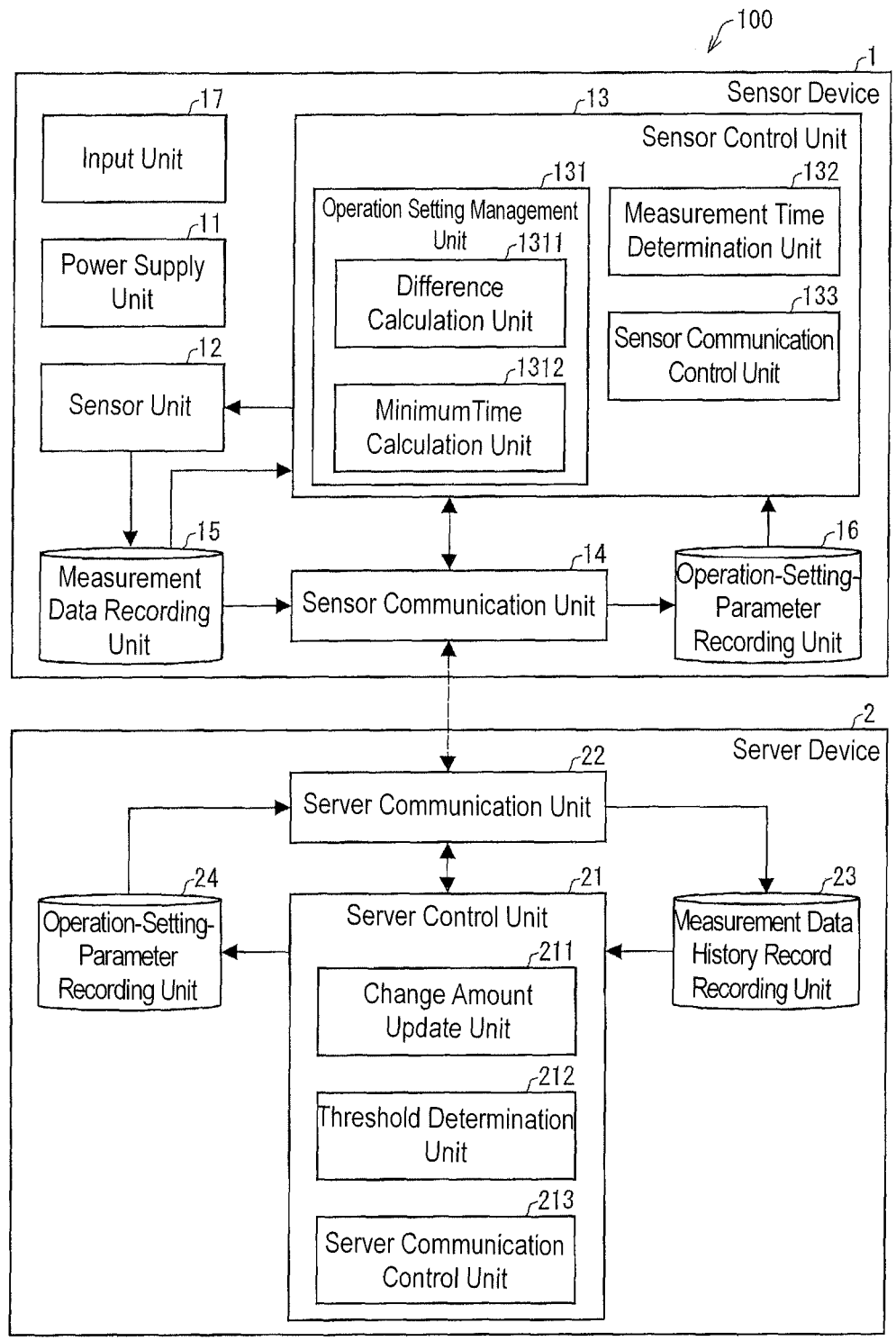
FIG. 1 is a block diagram illustrating a configuration of a sensor device and a sensor management system according to one or more embodiments of the present invention.

As illustrated in FIG. 1, a sensor management system 100 according to one or more embodiments of the present invention includes a sensor device 1 and a server device 2 for managing the sensor device 1, which communicate with each other. This communication may use a wireless circuit or may use a wired circuit. Alternatively, the function of the server device 2 may be incorporated into the sensor device 1. In the explanation about one or more embodiments of the present invention, the sensor device 1 communicates with the server device 2. However, the number of sensor devices 1 communicating with the server device 2 is not limited.

The sensor device 1 includes a power supply unit 11, a sensor unit 12, a sensor control unit (sensor control means) 13, a sensor communication unit 14, a measurement data recording unit 15, an operation-setting-parameter recording unit (change amount recording unit) 16, and an input unit 17.

The power supply unit 11 is a driving source of the sensor device 1, and is a replaceable battery in one or more embodiments of the present invention. It should be noted that no battery may be provided, and an electric power may be supplied from the outside.

The sensor unit 12 is a sensor for measuring a measurement subject. For example, it is a physical sensor such as a temperature sensor, a humidity sensor, an illuminance sensor, a flow sensor, a pressure sensor, a soil temperature sensor, a particle sensor, and the like, and a chemical sensor such as a $CO_2$ sensor, a pH sensor, an EC sensor, and a soil moisture sensor is used.

The sensor control unit 13 is a block for centrally controlling operation of various elements in the sensor device 1. The sensor control unit 13 controls the sensor device 1 on the basis of information recorded in a recording unit (not shown) that stores control programs of the sensor device 1, OS (Operating System) program, various other kinds of programs and the like.

The sensor control unit 13 includes an operation setting management unit 131, a measurement time determination unit (measurement time determination means) 132, and a sensor communication control unit (sensor communication control means) 133.

The operation setting management unit 131 is a block for making operation setting of the sensor unit 12 for measurement of the measurement subject, on the basis of operation setting parameters recorded in the operation-setting-parameter recording unit 16.

The operation setting management unit 131 includes a difference calculation unit (difference calculation means) 1311 and a minimum time calculation unit (minimum time calculation means) 1312, and the difference calculation unit 1311 calculates the difference between a threshold and a current measured value measured by the sensor unit 12. The minimum time calculation unit 1312 looks up data of the maximum amount of change of the measured value with respect to elapsed time, which are recorded in the operation-setting-parameter recording unit 16, and calculates the minimum arrival time that is the minimum time for the measurement subject to arrive at the threshold from the current measured value on the basis of the difference calculated by the difference calculation unit 1311. The data of the maximum amount of change of the measured value with respect to elapsed time are one of the operation setting parameters, and are generated on the basis of multiple measured value history records which are measured values of the measurement subject in the past. The measured value history record is generated by the server device 2.

The measurement time determination unit 132 is a block for determining a measurement time interval of the sensor device 1 by choosing whichever time is the greater of the calculated minimum arrival time and the minimum time interval at which the sensor device 1 can measure. More specifically, the measurement time determination unit 132 determines the time of the next measurement of the measurement subject by choosing whichever time is the greater of the minimum arrival time and the minimum time interval.

Then, the sensor control unit 13 controls the sensor unit 12 to measure the measurement subject at the time determined by the measurement time determination unit 132.

Figure 2A:
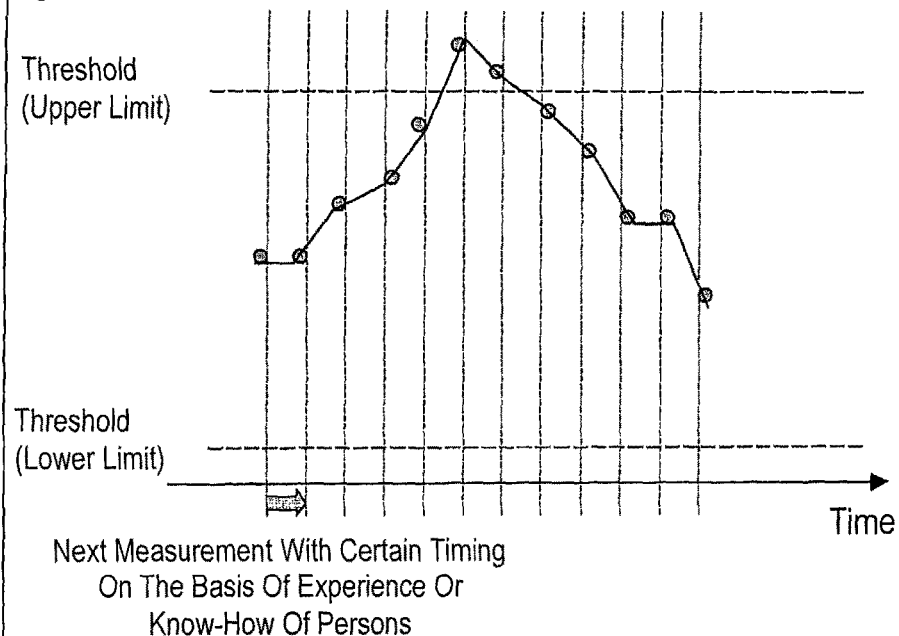
FIG. 2A is a figure for explaining a conventional measurement frequency.
Figure 2B:
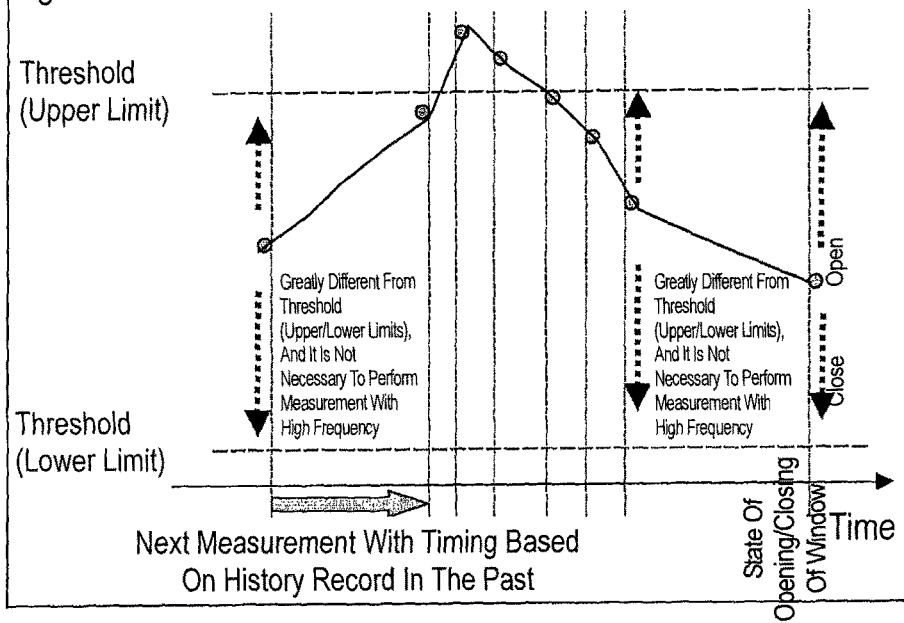
FIG. 2B is a figure for explaining measurement frequency according to one or more embodiments of the present invention.

FIG. 2A illustrates an example of a conventional sensor device, and FIG. 2B illustrates relationship between a measured value and measurement time of the sensor device 1 according to one or more embodiments of the present invention. As compared with the conventional sensor device that measures at a regular time interval (regular timing) on the basis of experience or know-how of persons, the number of measurements is reduced in the sensor device 1 according to one or more embodiments of the present invention.

The sensor device 1 according to one or more embodiments of the present invention calculates the minimum arrival time on the basis of the difference between the current measured value and the threshold and the maximum amount of change of the measured value with respect to elapsed time on the basis of the measured value history record, and changes the measurement frequency. When the current measured value and the predetermined threshold are greatly different from each other, i.e., when the current measured value is greatly different from the threshold, the minimum arrival time calculated from the maximum amount of change of the measured value with respect to elapsed time and this difference is increased in the sensor device 1. In this case, the time interval from the current time to the time of the next measurement is increased. In other words, when the difference is large, the measurement frequency is decreased. On the other hand, when the difference is small, i.e., when the current measured value is close to the threshold, the minimum arrival time calculated from the maximum amount of change and the difference is decreased. In this case, the time interval from the current time to the time of the next measurement is decreased. In other words, when the difference is small, the measurement frequency is increased.

Therefore, the sensor device 1 according to one or more embodiments of the present invention can change the measurement frequency on the basis of the difference between the current measured value and the threshold and the maximum amount of change of the measured value with respect to elapsed time on the basis of the measured value history record which is multiple measured values in the past, and optimize the frequency of the measurement. Therefore, useless measurement can be eliminated, and the power consumption can be reduced. In addition, the threshold is set as a threshold for controlling devices and the like controlled by the measured value measured by the sensor device, so that this can contribute to appropriate control of the devices and the like.

Now, the maximum amount of change will be explained. The maximum amount of change may be recorded for each of the multiple elapsed times. In this case, the minimum time calculation unit 1312 calculates, as the minimum arrival time, the shortest elapsed time of elapsed times for the maximum amount of change including the value of the calculated difference. In this case, the maximum amount of change is recorded for each of the multiple elapsed times, and therefore, by choosing the shortest elapsed time for the maximum amount of change including the value of the difference in accordance with the difference, the minimum arrival time can be calculated.

Alternatively, the maximum amount of change per unit time may be recorded. When the maximum amount of change per unit time is recorded, the minimum time calculation unit 1312 calculates, as the minimum arrival time, a quotient obtained by dividing the difference by the maximum amount of change per unit elapsed time. In this case, the number of the maximum amount of changes recorded in the operation-setting-parameter recording unit 24 and the operation-setting-parameter recording unit 16 can be reduced.

It should be noted that the operation setting parameter recorded in the operation-setting parameter recording unit 16 may include initial setting parameters. In this case, when there is no measured value history record or there are a few measured value history records, the operation setting management unit 131 makes each setting of the sensor unit on the basis of the initial setting parameters, and the measurement time determination unit determines the measurement time on the basis of the initial setting parameters. Then, when a predetermined number of measurement data or more are accumulated, and the measured value history records increase, the determination of the measurement time based on the calculation of the difference and the minimum arrival time is used.

Figure 3:
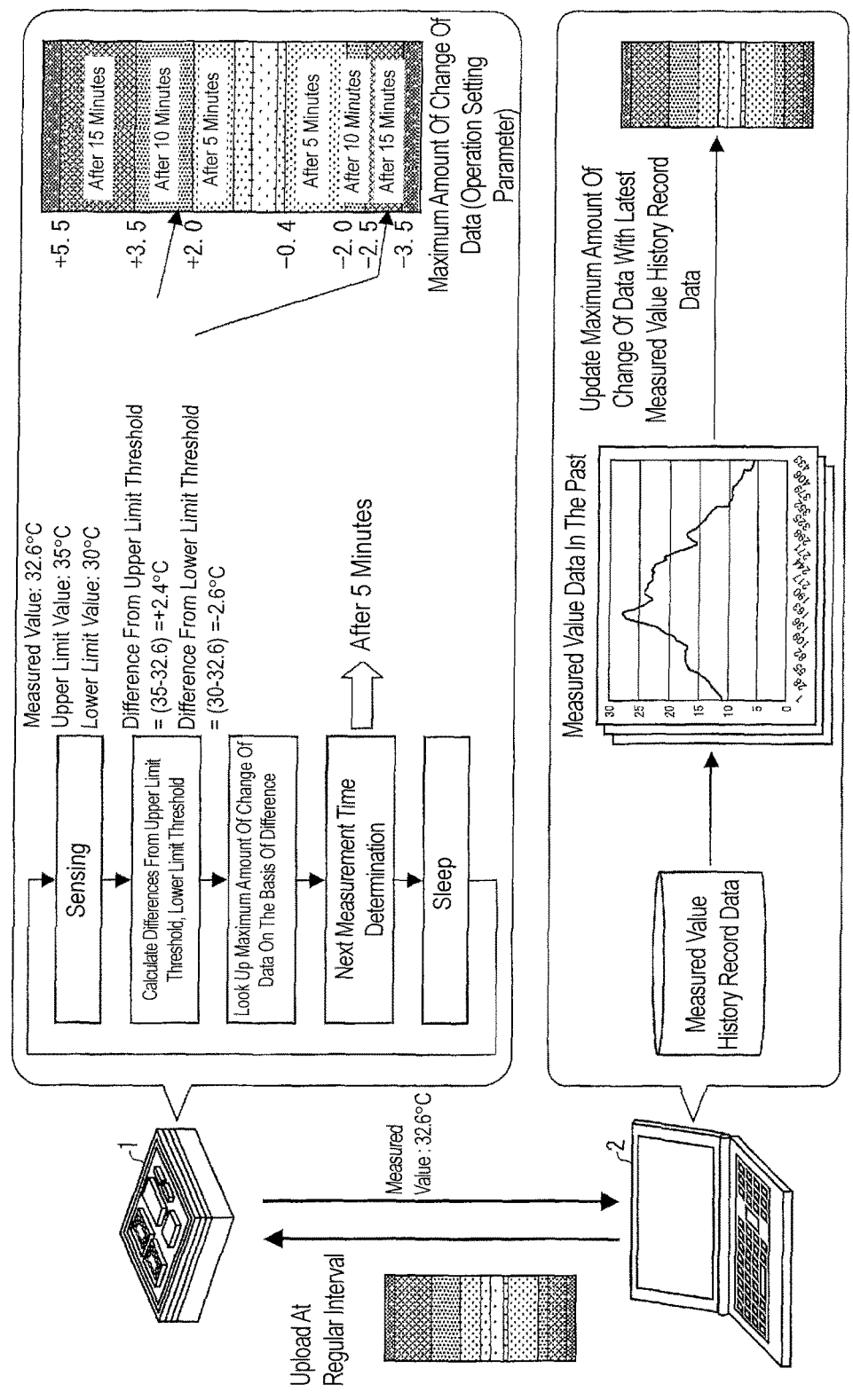
FIG. 3 is a figure for explaining flow of data in the sensor device and a server device for managing the sensor device.

As illustrated in FIG. 3, when the measured value is 32.6° C., the upper limit value of the threshold is 35° C., and the lower limit value is 30° C., then the differences thereof are +2.4° C., −2.6° C., respectively, and the minimum arrival times thereof are 10 minutes, 15 minutes, respectively. In this case, the minimum time calculation unit 1312 selects 10 minutes, which is smaller, and derives 5 minutes, which is less than 10 minutes, as the minimum arrival time. This is because of the following reason.

When the measurement is performed with the minimum arrival time or more, the threshold may have already been arrived at when the measurement is performed. Therefore, when the threshold is set as a threshold for controlling devices and the like controlled by the measured value measured by the sensor device 1, the value may be greatly beyond the threshold, and the control may not be performed on time. However, when a next measurement is performed with a time less than the calculated minimum arrival time, the measurement can be done and the devices and the like can be controlled before the predetermined threshold is arrived at, and therefore, this can prevent failure of the control of the devices and the like performed on time. It should be noted that a next measurement may be performed with the minimum arrival time.

The sensor communication unit 14 is a block for communicating with an external device such as the server device 2, and the communication is controlled by the sensor communication control unit 133.

The input unit 17 is a block for receiving operation input corresponding to setting and operation command given by the user. The user may determine the threshold, and the input unit 17 may input it into the sensor device 1. When the threshold is set as a control threshold for controlling devices and the like controlled by the measured value measured by the sensor device 1, the devices and the like can be appropriately controlled on the basis of experience of the user. Further, the sensor device 1 may be provided with a display unit and the like for presenting information to the user.

The server device 2 is a server for managing the sensor device 1, and includes a server control unit 21, a server communication unit 22, a measurement data history record recording unit 23, and an operation-setting-parameter recording unit 24.

The server control unit 21 is a block for centrally controlling operation of various elements in the server device 2. The server control unit 21 controls the server device 2 on the basis of information recorded in a recording unit (not shown) that stores control programs of the server device 2, OS (Operating System) program, various other kinds of programs and the like.

The server control unit 21 includes a change amount update unit (change amount update means) 211 and a threshold determination unit (threshold determination means) 212. The threshold determination unit 212 determines the threshold on the basis of the measured value history record, and the server communication control unit (server communication control means) 213 transmits the threshold determined by the threshold determination unit 212 to the sensor device 1.

The change amount update unit 211 is a block for generating the measured value history record from the measured value received from the sensor device 1, and updates the maximum amount of change on the basis of the measured value history record. The measured value history record is accumulated in the measurement data history record recording unit 23.

The updated maximum amount of change is recorded in the operation-setting-parameter recording unit 24. The updated maximum amount of change is transmitted from the server communication unit 22 to the sensor device 1 under the control by the server communication control unit 213.

The server communication unit 22 is a block for communicating with an external device such as the sensor device 1, and the communication is controlled by the server communication control unit 213.

Further, the server device 2 includes a user interface (UI) and the like having an input unit that receives operation input corresponding to setting and operation command given by the user, not shown, and a display unit that presents information to the user.

The server device 2 includes an environment control unit (not shown) that changes the measurement environment of the measurement subject when the measured value of the measurement subject becomes more than the threshold. The environment control unit is connected to the devices and the like via the server communication unit 22, and changes the measurement environment by controlling the devices and the like. This will be explained more specifically. When the measurement subject is the temperature of a greenhouse, and the devices and the like are a motor for opening and closing a window of the greenhouse, the environment control unit controls the motor to open or close the window, so that the state in which the window of the greenhouse is open is changed to the state in which the window is closed, or the state in which the window of the greenhouse is closed is changed to the state in which the window is open.

At this occasion, when the current measured value of the measurement subject is more than the threshold, the environment control unit may change the measurement environment of the measurement subject, so that the measured value of the measurement subject does not become more than the management value (management threshold). When the devices and the like are controlled, the threshold determination unit 212 determines, as the threshold, a value obtained by subtracting, from the management value, the maximum amount of the measured value changing after the environment control unit changes the measurement environment, obtained from the measured value history record. Alternatively, the threshold determination unit 212 obtains a first value obtained by subtracting, from the management value, the maximum amount of the measured value changing after the environment control unit changes the measurement environment, obtained from the measured value history record, and further, determines, as the threshold, a second value obtained by subtracting, from the first value, the maximum amount of the measured value at the minimum time interval at which the sensor device can measure, obtained from the measured value history record. A method for determining the threshold on the basis of the measured value history record of the threshold determination unit 212 will be explained in details in a more specific manner in examples 3, 4 later.

As illustrated in FIG. 3, in the sensor management system 100, data of the measured value obtained when the sensor unit 12 measures the measurement subject (measurement data) are transmitted from the sensor device 1 to the server device 2. Then, the server device 2 accumulates the received measurement data and generates data of the measured value history record, and on the basis of the measured value history record, the data of the maximum amount of change are updated, and are transmitted to the sensor device 1. The sensor device 1 determines the time of the next measurement on the basis of the difference and the received maximum amount of change, and measures the measurement subject at the time thus determined. This is repeated.

Figure 4:
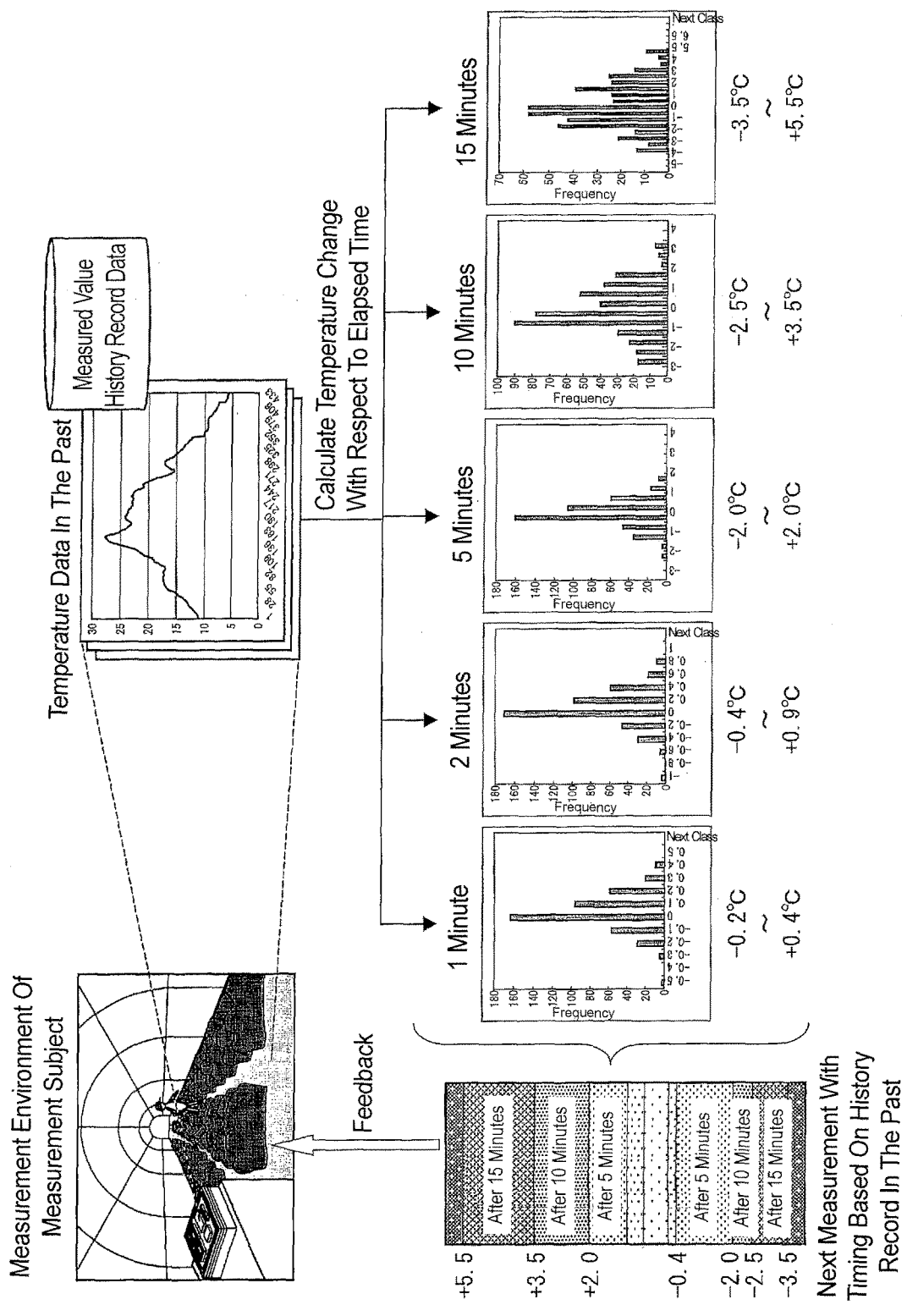
FIG. 4 is a figure for explaining a method for generating data of maximum amount of change with respect to elapsed time from measured value history records in the past.

Now, a method for updating or generating data of maximum amount of change from the measured value history record which is multiple measured values in the past will be explained with reference to FIG. 4. First, the maximum amount of change of the measured value with respect to elapsed time will be explained. It is understood that when the measured value is temperature, and 1 minute passes since the measured value history record (after 1 minute), the temperature changes to −0.2° C. to +0.4° C. In this case, the maximum amount of changes after one minute are −0.2 (maximum minus amount of change), +0.4 (maximum plus amount of change). When it is understood that after 2 minutes, the temperature changes to −0.4° C. to +0.9° C., the maximum amount of changes after two minutes are −0.4 (maximum minus amount of change), +0.9 (maximum plus amount of change). In FIG. 4, the maximum amount of changes after 1, 2, 5, 10, 15 minutes are obtained respectively, and data of the maximum amount of changes with respect to elapsed times obtained by collecting them are shown. As described above, the maximum amount of changes with respect to elapsed times are obtained from the measured value history record. In one or more embodiments of the present invention, the measurement time is determined from the difference and the maximum amount of change with respect to elapsed time, and the measurement subject is measured, and on the basis of the measured value thus measured, the measurement environment of the measurement subject is controlled. More specifically, the maximum amount of change obtained from the measured value history record is given to the measurement environment of the measurement subject as a feedback.

Figure 5:
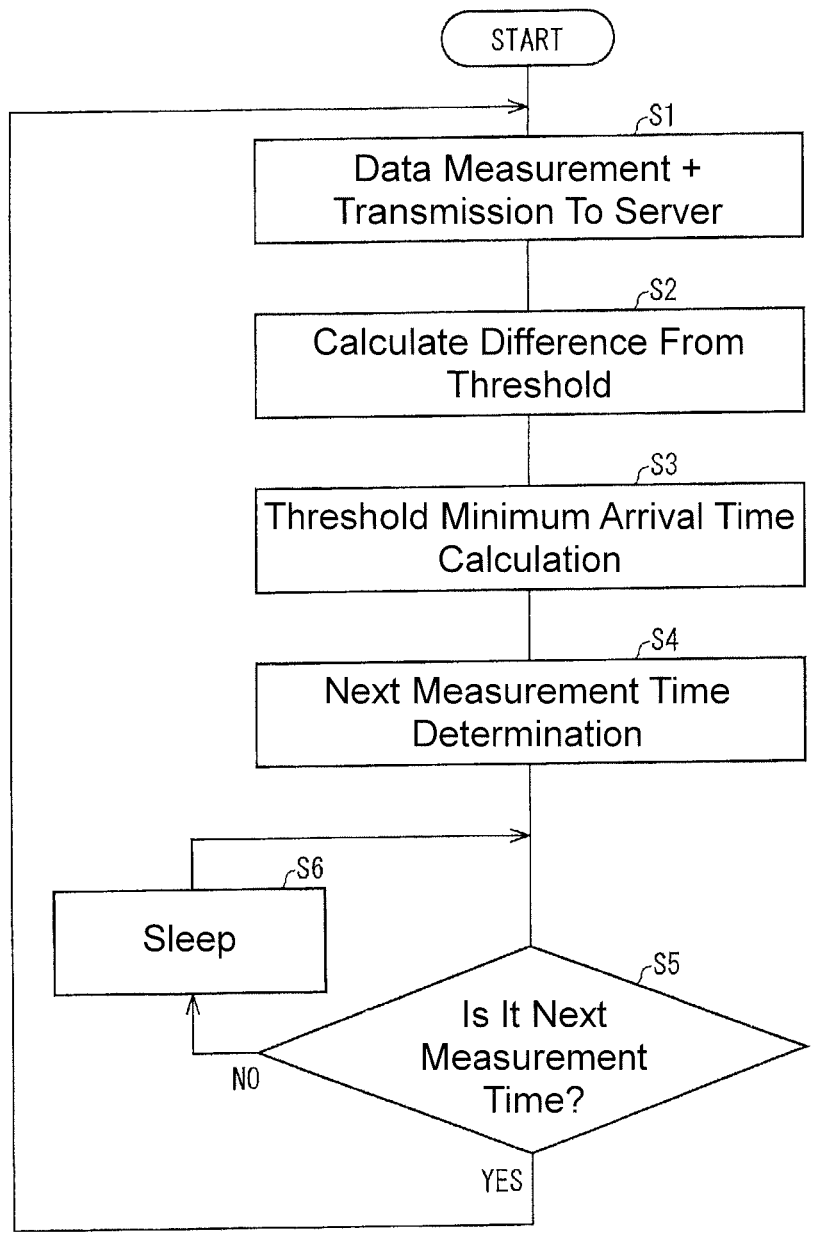
FIG. 5 is a figure illustrating a flow of processing of measurement performed by the sensor device.

FIG. 5 illustrates a flow of measurement processing in the sensor device 1. Each processing is controlled by the sensor control unit 13.

First, the sensor unit 12 measures the measurement subject, and the sensor communication control unit 133 transmits the measured value (measurement data) from the sensor communication unit 14 to the server device 2 (step S1).

Subsequently, the difference between the measured value and the threshold is calculated (step S2). When there are multiple thresholds, the difference is calculated for each of them.

Subsequently, the maximum amount of change data of the measured value with respect to elapsed time recorded in the operation-setting-parameter recording unit 16 is looked up, and the minimum arrival time for the measured value to arrive at the threshold is calculated (step S3). When there are multiple thresholds, the minimum arrival time is calculated for each of them.

Subsequently, the time of the next measurement of the measurement subject is determined from whichever time is the greater of the minimum arrival time and the minimum time interval at which the sensor device 1 can measure (step S4). Then, a determination is made as to whether it is the next time thus determined (step S5). When it is not yet the next time thus determined (NO in S5), the sensor unit 12 is changed to sleep mode, and when it is the next time (YES in S5), S1 is performed again, so that the measurement subject is measured and the measurement data are transmitted to the server device 2.

According to the above processing, the measurement frequency can be changed on the basis of the difference between the current measured value and the threshold and the maximum amount of change of the measured value with respect to elapsed time on the basis of the measured value history record which is multiple measured values in the past, and useless measurement can be eliminated. The frequency of the measurement can be optimized.

EXAMPLES

Subsequently, as specific examples, examples and a comparative example will be explained, in a case where, with the sensor device according to one or more embodiments of the present invention, the temperature in a greenhouse (room temperature) is measured, and the opening and closing of the windows of the greenhouse is controlled. These are merely examples, and the use of the sensor device of one or more embodiments of the present invention is not limited thereto.

In the greenhouse, the temperature is measured by the sensor device, and opening and closing of the window is controlled so that the temperature does not increase to a level more than 40° C. and does not decrease to a level less than 25° C. In the following comparative example and Examples 1 to 4, sensor devices having the same configuration are used, and only difference configurations will be explained. All the sensor devices are operated from electric power provided by a battery.

Comparative Example

As a comparative example, a measurement result obtained by a sensor device according to the comparative example that performs measurement at a regular time interval at all times will be explained. The sensor device of the comparative example performs measurement every one minute, and transmits measurement result to the server device on every measurement.

Figure 6:
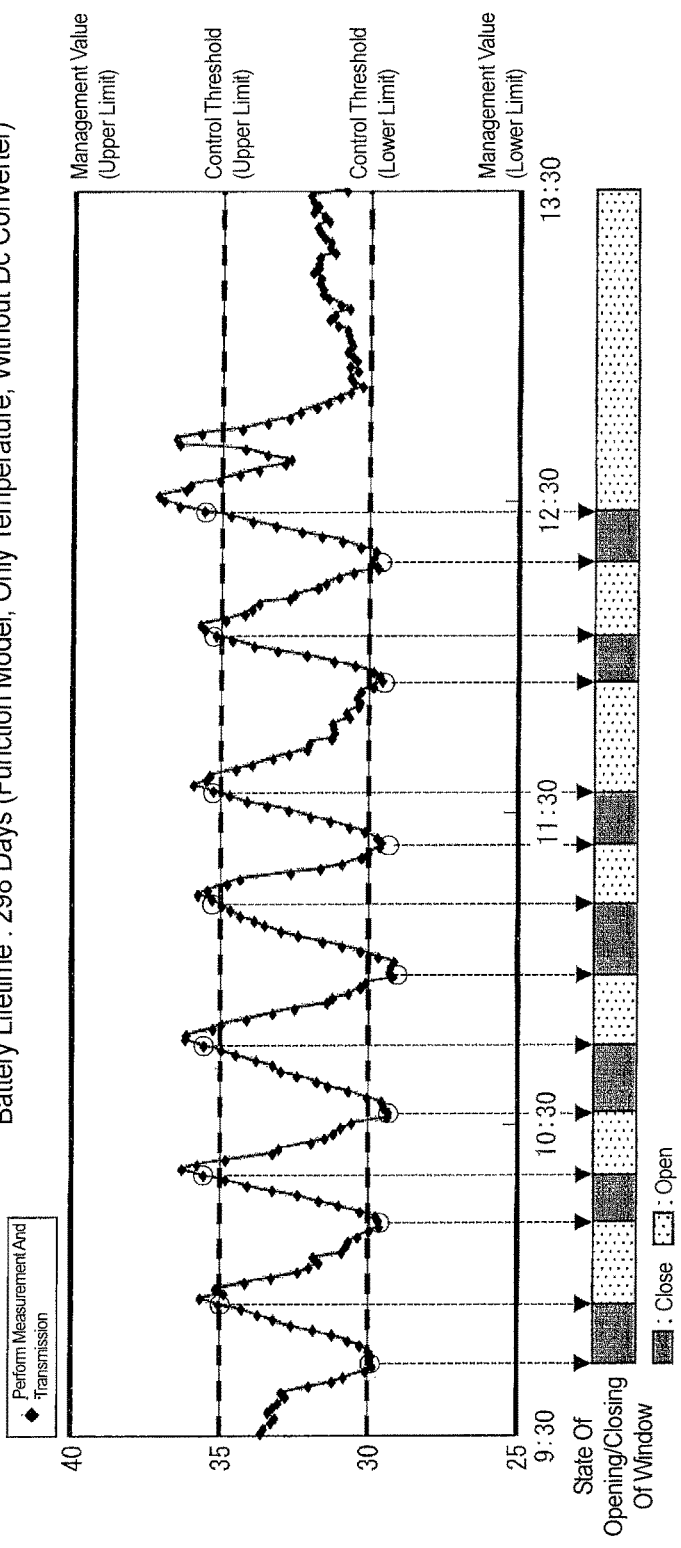
FIG. 6 is a figure illustrating a measurement result when a sensor device according to a comparative example is used.

FIG. 6 is a graph illustrating measured values from 9:30 to 13:30 when the sensor device of the comparative example is used. The upper limit of the control threshold is 35° C., and the lower limit is 30° C. The setting is made so that the control is performed so as to open the window when the measured value is more than 35° C., and the control is performed so as to close the window of the greenhouse when the measured value is less than 30° C.

With the sensor device of the comparative example, the number of measurements per day was 1440, and the number of transmissions was also 1440. The amount of electric power consumed in this case was 0.168 mA·h. The lifetime of the battery was 298 days.

Example 1

The sensor device of Example 1 calculates the difference between the current measured value and the threshold, calculates the minimum arrival time for arriving at the threshold on the basis of the difference and the maximum amount of change, and determines the time of the next measurement from whichever time is the greater of the minimum arrival time and the minimum time interval at which the sensor device can measure (1 minute).

Figure 7:
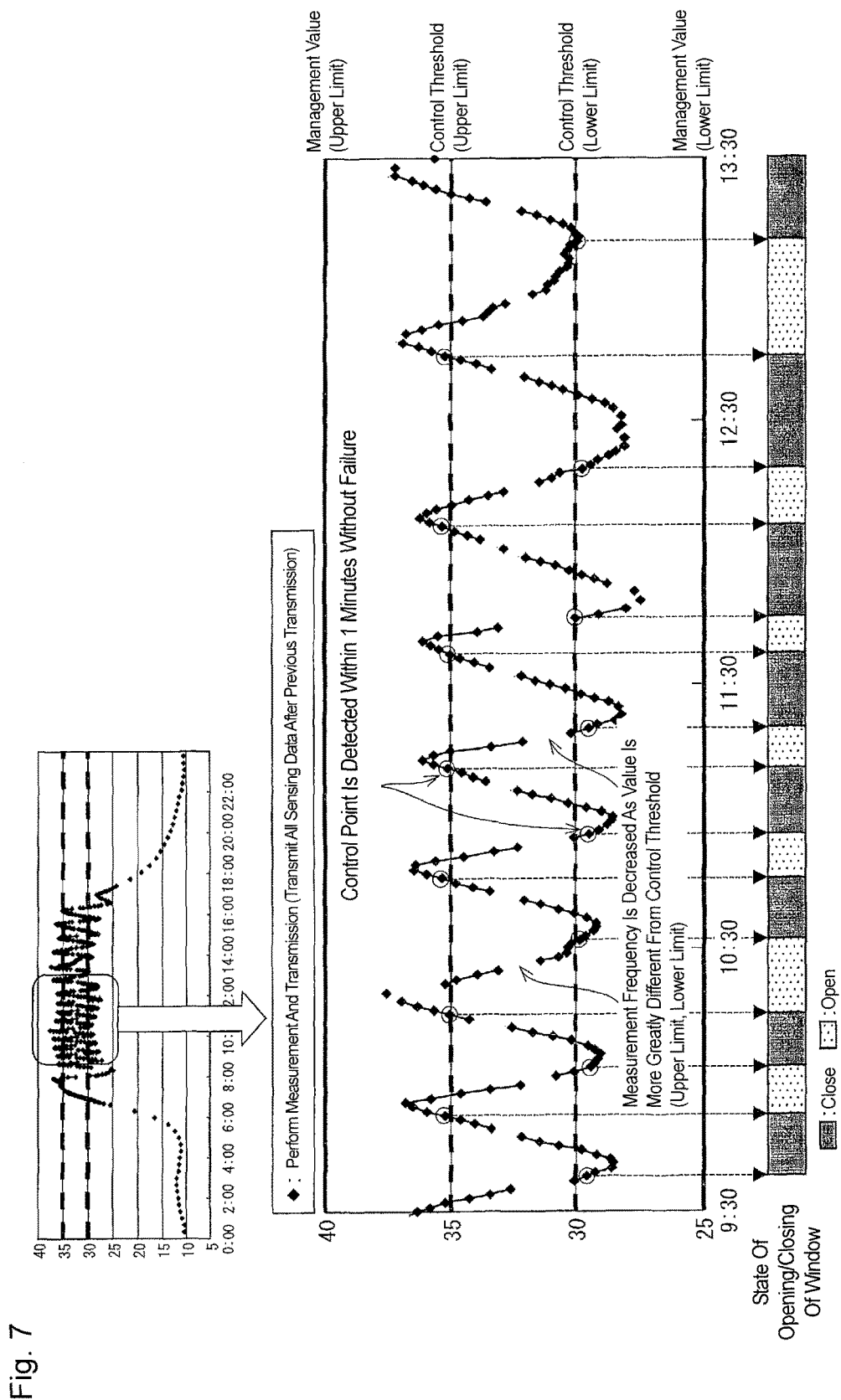
FIG. 7 is a figure illustrating measurement result when a sensor device according to a first example is used.

FIG. 7 is a graph illustrating measured values from 9:30 to 13:30 when the sensor device of Example 1 is used. The upper limit of the control threshold is 35° C., and the lower limit is 30° C. The setting is made so that the control is performed so as to open the window when the measured value is more than 35° C., and the control is performed so as to close the window of the greenhouse when the measured value is less than 30° C. The determination of the control thresholds, i.e., 30° C., 35° C., is based on experience of the user. The farther the value is away from the control threshold, the more greatly the measurement frequency is decreased.

In this case, there are two control thresholds, i.e., 30° C. and 35° C., and in each measurement, the difference from 30° C. and the difference from 35° C. are obtained, and the minimum arrival time is calculated (see FIG. 3).

With the sensor device of Example 1, the number of measurements and the number of transmissions per day were about 38% of the numbers of those of the sensor device of the comparative example. In other words, the numbers of measurements and transmissions were reduced by about 62% as compared with the sensor device of the comparative example. The amount of electric power consumed in this case was about 41.1% of that of the comparative example. The lifetime of the battery was about 2.4 times the lifetime of the comparative example.

The difference between the measured value and the threshold is greater at night time than day time. Therefore, at night time, the measurement frequency is decreased, and the power consumption can be reduced. On the other hand, at day time, the measured value is increased almost to the threshold. However, with the sensor device of Example 1, even at day time, the measurement frequency is decreased, and the power consumption can be reduced when the value is around the center between the thresholds of the upper limit and the lower limit. It is confirmed that, even when the time between 9 to 17:30 is considered, the number of measurements and the number of transmissions can be reduced by about 21% as compared with 510 times of the sensor device of the comparative example. With the use of the sensor device of Example 1, even if the state from 9 to 17:30 continues the whole day, the amount of electric power consumed is about 82% of the sensor device of the comparative example, and the lifetime of the battery is about 1.2 times the lifetime of the sensor of the comparative example.

Example 2

The sensor device of Example 2 has the configuration of the sensor device of Example 1, and in addition, the sensor device of Example 2 selects one of multiple thresholds, and using the selected threshold, the sensor device of Example 2 calculates the difference and minimum arrival time.

The upper limit of the control threshold is 35° C., and the lower limit is 30° C. When 35° C. is selected as the current threshold, and the measured value is more than 35° C., 30° C. is selected as the current threshold. When the measured value is less than 30° C., 35° C. is selected as the current threshold. Using the selected threshold, the difference and the minimum arrival time are calculated.

In the sensor device of Example 2, even though multiple thresholds are set, the difference and the minimum arrival time for only the currently selected threshold are required to be calculated, and therefore, this reduces the number of calculations as compared with the sensor device of Example 1, which calculates the differences and the minimum arrival times for all the thresholds. If the same measured value follows the same transition by selecting one threshold, the number of measurements is reduced. This will be hereinafter explained.

When multiple thresholds are used for calculation of the difference and the minimum arrival time, and the measured value is close to any one of the thresholds, the time of the next measurement is determined in such a manner that the interval from the current time is short. On the other hand, when a selected threshold is used for the calculation, and even if the measured value is close to any one of the thresholds, the time of the next measurement is determined as follows: when it is greatly different from the currently selected threshold, and is close to the non-selected threshold, the time of the next measurement is determined in such a manner that the interval from the current time is long. Therefore, the number of measurements is smaller when a selected threshold is used than when multiple thresholds are used for the calculation of the difference and minimum arrival time. For this reason, with the sensor device of Example 2, the power consumption due to useless measurement can be further reduced.

Figure 8:
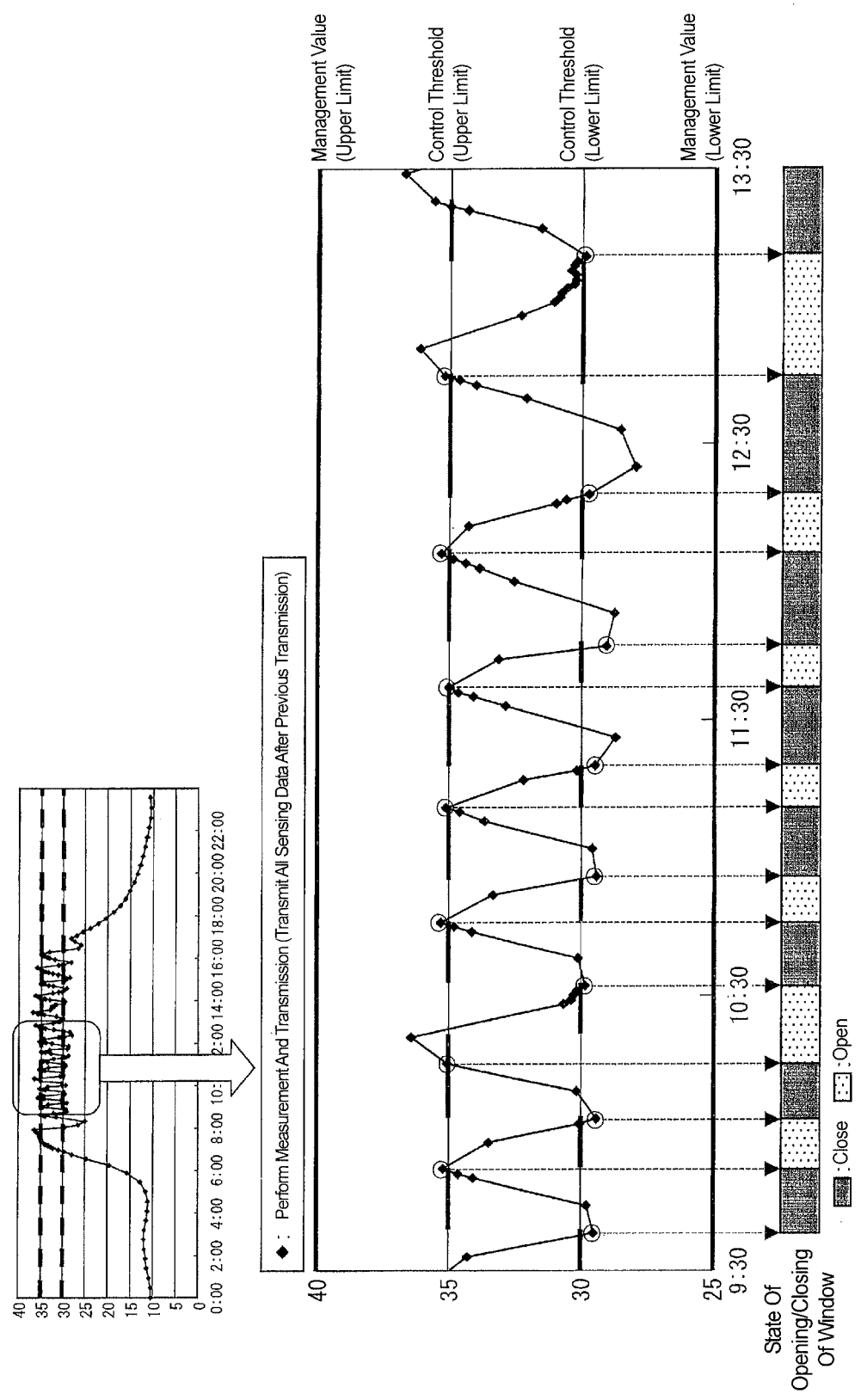
FIG. 8 is a figure illustrating measurement result when a sensor device according to a second example is used.

FIG. 8 is a graph illustrating measured values from 9:30 to 13:30 when the sensor device of Example 2 is used. The upper limit of the control threshold is 35° C., and the lower limit is 30° C. The setting is made so that the control is performed so as to open the window when the measured value is more than 35° C., and the control is performed so as to close the window of the greenhouse when the measured value is less than 30° C. The determination of the control thresholds, i.e., 30° C., 35° C., is based on experience of the user. It is understood that as compared with the sensor device of Example 1, the number of measurements is decreased.

With the sensor device of Example 2, the number of measurements and the number of transmissions per day were about 15% of the numbers of those of the sensor device of the comparative example, and were about 39% of the numbers of those of the sensor device of Example 1. The amount of electric power consumed in this case was about 18% of that of the sensor device of the comparative example, and was about 43% of that of the sensor device of the sensor device of Example 1. The lifetime of the battery was about 5.6 times the lifetime of the sensor device of the comparative example, and was about 2.3 times the lifetime of the sensor device of Example 1.

In particular, the sensor device of Example 2 can reduce the measurement frequency to a still lower level even at day time when the measured value increases to a level close to the threshold. It is confirmed that, when the time between 9 to 17:30 is considered, the number of measurements can be reduced by about 36% as compared with the number of measurements of the sensor device of Example 1, which is a great reduction. With the use of the sensor device of Example 2, even if the state from 9 to 17:30 continues the whole day, the amount of electric power consumed is about 31% of the sensor device of the comparative example, and the lifetime of the battery is about 3.2 times the lifetime of the sensor device of the comparative example.

Example 3

The sensor device of Example 3 has the configuration of the sensor device of Example 1, and in addition, the sensor device of Example 3 obtains a measurement threshold (first value, 37.5° C.) obtained by subtracting, from a management value (40° C.), the maximum amount of the measured value changing after the window is opened, obtained from the measured value history record, and further, determines, as a threshold of control for opening the window, a control threshold (second value, 37° C.) obtained by subtracting, from the measurement threshold, the maximum amount of change of the measured value at the minimum time interval at which the sensor device can measure, obtained from the measured value history record. Likewise, the sensor device of Example 3 obtains a measurement threshold (first value, 27.5° C.) obtained by subtracting, from the management value, the maximum amount of the measured value changing after the window is closed, obtained from the measured value history record, and further, determines, as a threshold of control for closing the window, a control threshold (second value, 28° C.) obtained by subtracting, from the measurement threshold, the maximum amount of change of the measured value at the minimum time interval at which the sensor device can measure, obtained from the measured value history record.

Figure 9:
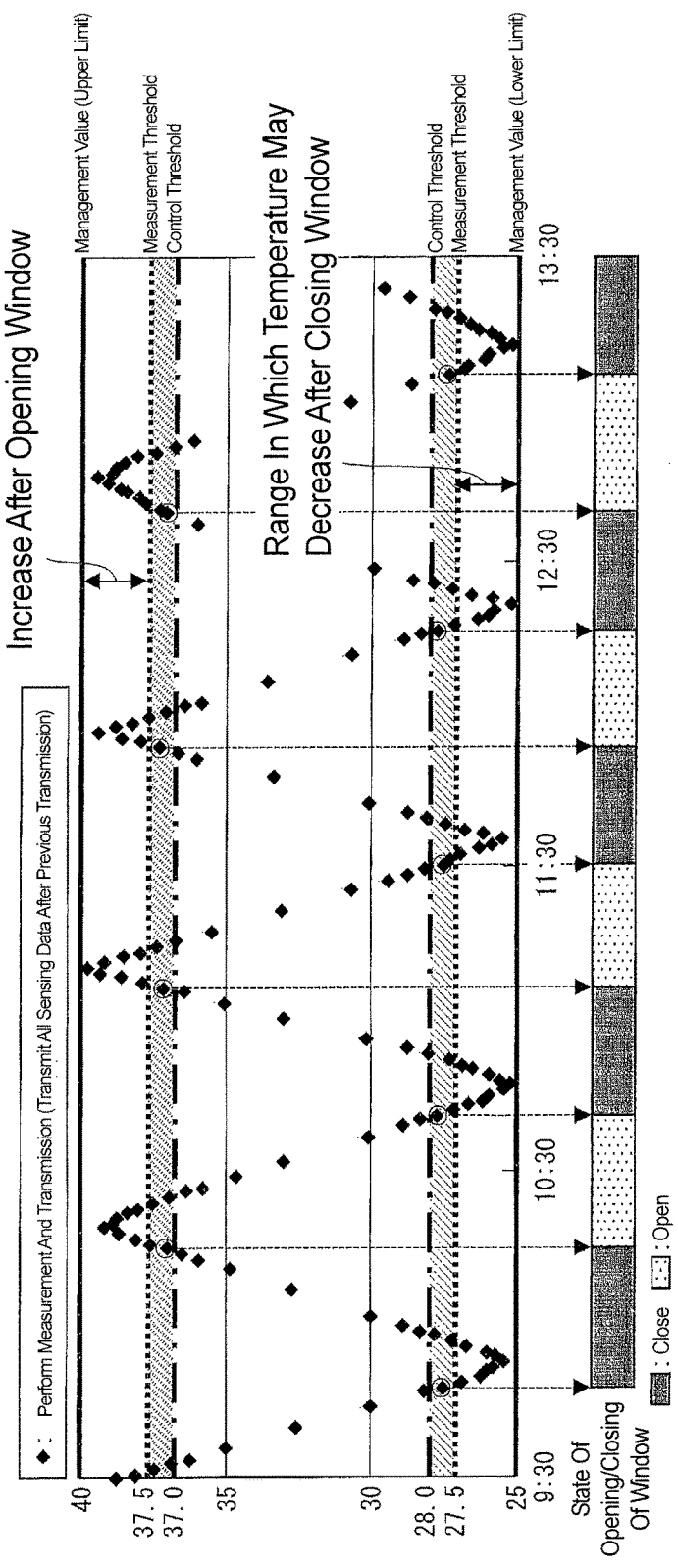
FIG. 9 is a figure illustrating measurement result when a sensor device according to a third example is used.

FIG. 9 is a graph illustrating measured values from 9:30 to 13:30 when the sensor device of Example 3 is used. In the graph, a horizontal solid line denotes a management value, a dotted line denotes a measurement threshold, and a dashed line denotes a management value. In FIG. 9, the thresholds are constant (straight line), but, for example, the measurement threshold and the management value may be changed in accordance with weather, season, time of day, and the like, on the basis of the measured value history record.

In the sensor device of Example 3, the number of measurements and the number of transmissions decrease and the lifetime of the battery increases, as compared with the sensor device of Example 1.

In the above, the control threshold is used as the threshold for opening and closing of the window. Alternatively, the measurement threshold may be determined as the threshold for opening and closing of the window.

Example 4

The sensor device of Example 4 has the configuration of the sensor device of Example 3, and in addition, the sensor device of Example 1 selects one of multiple thresholds and calculates the difference and minimum arrival time using the selected threshold. The method for selecting the threshold is the same as that of Example 2.

Figure 10:
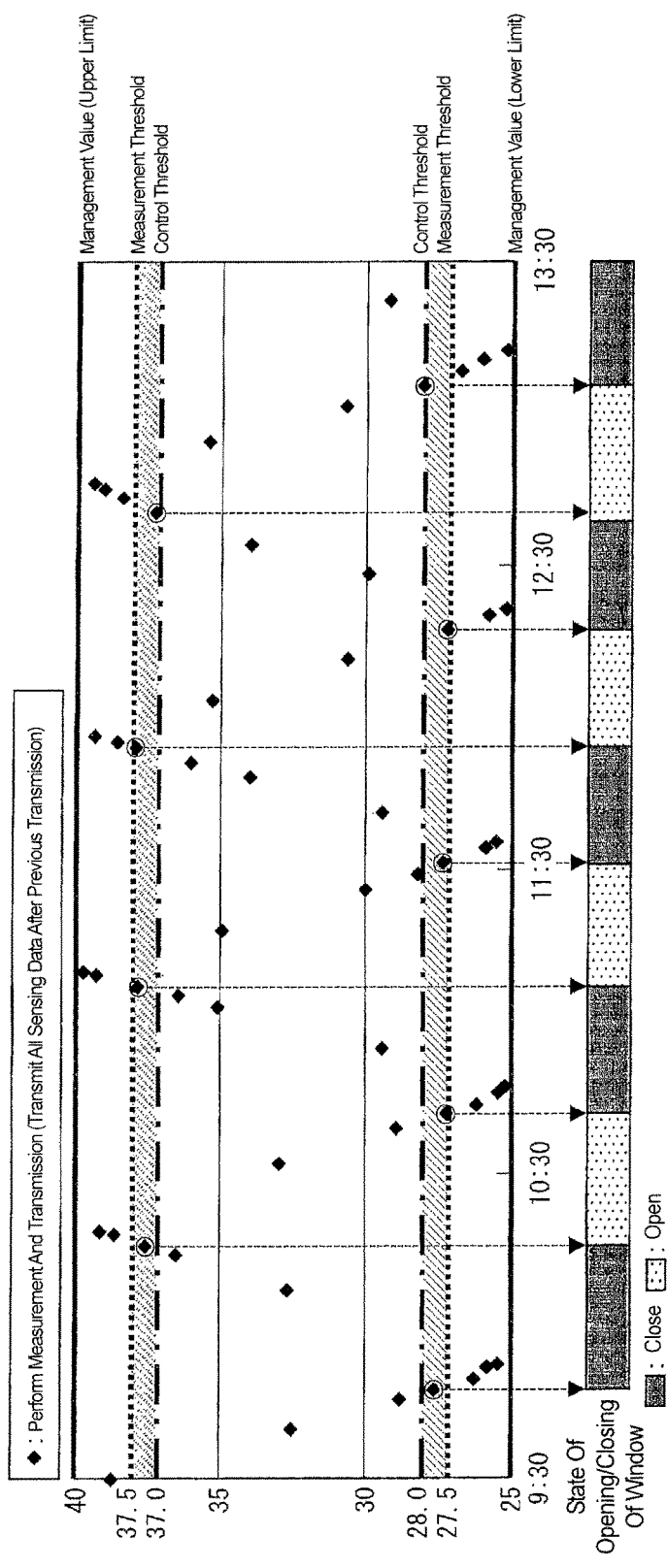
FIG. 10 is a figure illustrating measurement result when a sensor device according to a fourth example is used.

FIG. 10 is a graph illustrating measured values from 9:30 to 13:30 when the sensor device of Example 4 is used.

In the sensor device of Example 4, the number of measurements and the number of transmissions decrease and the lifetime of the battery increases, as compared with the sensor device of Example 2.

(Application of Sensor Device)

In the comparative example and each example, the explanation has been made using an example where the temperature in the greenhouse is measured, and opening/closing of the window of the greenhouse is controlled. However, the sensor device 1 and the sensor management system 100 according to one or more embodiments of the present invention are useful for control of environment where measurement data transit with gradual change. For example, environment for which one or more embodiments of the present invention is useful includes clean room, server room, building, office, and the like. One or more embodiments of the present invention is useful when air conditioning and FFU are controlled in order to maintain the temperature, the humidity, the degree of cleanliness in the clean room in a management range. One or more embodiments of the present invention is useful when the air conditioning is controlled in order to maintain the temperature and the humidity in a server room, building, and office in the management range. These are simply examples, and one or more embodiments of the present invention can also be used other than the above.

The sensor device 1 and the sensor management system 100 according to one or more embodiments of the present invention are useful for a sensor for measuring a measurement subject transiting with gradual change. For example, the sensor device 1 and the sensor management system 100 according to one or more embodiments of the present invention are useful for a physical sensor such as a temperature sensor, a humidity sensor, an illuminance sensor, a flow sensor, a pressure sensor, a soil temperature sensor, a particle sensor, and the like, and a chemical sensor such as a $CO_2$ sensor, a pH sensor, an EC sensor, and a soil moisture sensor. These are also simply examples, and one or more embodiments of the present invention can also be applied to other than the above.

Each block of the sensor device 1 and the server device 2, i.e., in particular, the sensor control unit 13 and the server control unit 21, may be constituted by either hardware logic or may be achieved with software using a CPU as explained below.

More specifically, each of the sensor device 1 and the server device 2 includes a CPU (central processing unit) executing commands of a control program achieving each function and a recording device (recording medium) such as a memory storing the program and various kinds of data such as a ROM (read only memory) storing the program and a RAM (random access memory) in which the program is extracted. Further, according to one or more embodiments of the present invention, each of the sensor device 1 and the server device 2 with a recording medium which records program codes of the control program of each of the sensor device 1 and the server device 2 which is software achieving the above functions (execution format program, intermediate code program, source program) in a computer-readable manner, and by causing the computer (or a CPU or an MPU) to read and execute the program codes recorded in the recording medium.

Examples of recording media include a tape system such as a magnetic tape and a cassette tape, a disk system including a magnetic disk such as a floppy (registered trademark) disk/a hard disk and an optical disk such as CD-ROM/MO/MD/DVD/CD-R, a card system such as an IC card (including a memory card)/an optical card, and a semiconductor memory system such as a mask ROM/EPROM/EEPROM/flash ROM.

Alternatively, program codes may be provided via a network. This network is not particularly limited. For example, the Internet, an intranet, an extranet, LAN, ISDN, VAN, CATV communication network, virtual private network, telephone network, mobile communication network, satellite communication network, and the like can be used as the network. A transmission medium constituting the network is not particularly limited. For example, the transmission medium may be a wired medium such as IEEE1394, USB, Power Line Communications, cable TV network, telephone line, and ADSL line. Alternatively, the transmission medium may be achieved wirelessly using, e.g., infrared communication such as IrDA and a remote controller, Bluetooth (registered trademark), 802.11 wireless network, HDR, cellular phone network, satellite circuit, digital terrestrial network, and the like. It should be noted that one or more embodiments of the present invention can also be achieved with a mode of computer data signal embedded into a carrier wave, which is realized as electronic transmission of the above program code.

As described above, a sensor device according to one or more embodiments of the present invention includes difference calculation means that calculates the difference between a predetermined threshold and a current measured value measured by a sensor unit that measures a measurement subject, a change amount recording unit that records the maximum amount of change of the measured value with respect to elapsed time on the basis of a plurality of measured value history records obtained by measuring the measurement subject, minimum time calculation means that calculates the minimum arrival time that is the minimum time for the measurement subject to arrive at the predetermined threshold from the current measured value on the basis of the calculated difference and the recorded maximum amount of change, measurement time determination means that determines the time of the next measurement of the measurement subject from whichever time is the greater of the calculated minimum arrival time and the minimum time interval at which the sensor device can measure, and sensor control means that controls the sensor unit in a manner so as to measure the measurement subject at the determined time.

According to the configuration, on the basis of the difference between the predetermined threshold and the current measured value and the maximum amount of change of the measured value with respect to elapsed time on the basis of the measured value history record which is multiple measured values in the past, the measurement frequency can be changed, and the frequency of the measurement can be optimized. Therefore, useless measurement can be eliminated, and the power consumption can be reduced. In addition, the predetermined threshold is set as a threshold for controlling devices and the like controlled by the measured value measured by the sensor device, so that this can contribute to appropriate control of the devices and the like.

The sensor device according to one or more embodiments of the present invention is configured as described above, and in addition, the change amount recording unit may record the maximum amount of change for each of a plurality of elapsed times, and the minimum time calculation means may calculate, as the minimum arrival time, a shortest elapsed time of elapsed times for the maximum amount of change including a value of the calculated difference.

According to the configuration, the maximum amount of change is recorded for each of the multiple elapsed times, and therefore, by choosing the shortest elapsed time for the maximum amount of change including the value of the difference in accordance with the difference, the minimum arrival time can be calculated.

The sensor device according to one or more embodiments of the present invention is configured as described above, and the change amount recording unit may record the maximum amount of change per unit time, and the minimum time calculation means may calculate, as the minimum arrival time, a quotient obtained by dividing the difference by the maximum amount of change per unit time.

According to the configuration, the minimum arrival time can be determined from the maximum amount of change per unit time. Therefore, the number of recorded maximum amount of changes can be reduced.

Moreover, the sensor device according to one or more embodiments of the present invention is configured as described above, and may further include an input unit that inputs the predetermined threshold.

According to the configuration, the user can determine the predetermined threshold, and can input it into the sensor device. When the predetermined threshold is set as a threshold for controlling devices and the like controlled by the measured value measured by the sensor device, the devices and the like can be appropriately controlled on the basis of experience of the user.

The sensor device according to one or more embodiments of the present invention is configured as described above, and when the calculated minimum arrival time is more than the minimum time interval at which the sensor device can measure, the measurement time determination means may determine the time of the next measurement so that a next measurement is performed in a time less than the calculated minimum arrival time.

When the minimum arrival time is more than the minimum time interval at which the measurement can be performed, and the measurement is performed with the minimum arrival time or more, the threshold may have already been arrived at when the measurement is performed. Therefore, when the predetermined threshold is set as a threshold for controlling devices and the like controlled by the measured value measured by the sensor device, the value may be greatly beyond the predetermined threshold, and the control may not be performed on time.

However, according to one or more embodiments of the present invention, the next measurement is performed in a time less than the calculated minimum arrival time, so that the measurement can be done, and the devices and the like can be controlled before the predetermined threshold is arrived at. As described above, according to the configuration, this can prevent failure of the control of the devices and the like performed on time.

The sensor device according to one or more embodiments of the present invention is configured as described above, and the predetermined threshold may comprise a plurality of predetermined thresholds, and the sensor device may include selection means that selects one of the plurality of thresholds, and a threshold correspondence information recording unit that records threshold correspondence information for associating a selected threshold and a next threshold selected subsequently, wherein when a currently selected threshold exists between the previous measured value and the current measured value, the selection means may extract a next threshold corresponding to the currently selected threshold from the threshold correspondence information, and updates the next threshold as the currently selected threshold, and the difference calculation means and the minimum time calculation means may use the currently selected threshold for the calculation.

According to the configuration, the predetermined threshold includes multiple predetermined thresholds, and when the currently selected threshold exists between the previous measured value and the current measured value, the next threshold corresponding to the currently selected threshold is extracted from the threshold correspondence information, and is updated as the currently selected threshold, and the currently selected threshold is used for the calculation of the difference and the minimum arrival time.

Therefore, when multiple predetermined thresholds are set, the difference and the minimum arrival time for only the currently selected threshold is required to be calculated, and therefore, this reduces the number of calculations as compared with a case where the differences and the minimum arrival times are calculated for all the thresholds.

If the same measured value follows the same transition by selecting one threshold, the number of measurements is reduced. This will be hereinafter explained. When multiple thresholds are used for calculation of the difference and the minimum arrival time, and the measured value is close to any one of the thresholds, the time of the next measurement is determined in such a manner that the interval from the current time is short. On the other hand, when a selected threshold is used for the calculation, and even if the measured value is close to any one of the thresholds, the time of the next measurement is determined as follows: when it is greatly different from the currently selected threshold, and is close to the non-selected threshold, the time of the next measurement is determined in such a manner that the interval from the current time is long. Therefore, the number of measurements is smaller when a selected threshold is used than when multiple thresholds are used for the calculation of the difference and minimum arrival time. For this reason, the power consumption due to useless measurement can be further reduced.

A sensor management system according to one or more embodiments of the present invention includes the sensor device according to any one of the above and a server device for managing the sensor device, wherein the sensor device further includes a sensor communication unit that communicates with the server device, and sensor communication control means that controls the sensor communication unit so as to transmit a measured value obtained by measuring the measurement subject to the server device, and the server device includes a server communication unit that communicates with the sensor device, change amount update means that generates the measured value history record from the measured value received from the sensor device and updates the maximum amount of change on the basis of the measured value history record, and server communication control means that controls the server communication unit so as to transmit the updated maximum amount of change to the sensor device.

According to the configuration, the sensor management system includes the sensor device of the present application and the server device for managing the sensor device, and the server device generates the measured value history record from the measured value received from the sensor device, updates the maximum amount of change on the basis of the measured value history record, and transmits it to the sensor device.

Therefore, on the basis of the difference between the predetermined threshold and the current measured value of the sensor unit and the maximum amount of change updated, the measurement frequency can be changed, and the frequency of the measurement can be optimized. Therefore, with the sensor management system, useless measurement can be eliminated, and the power consumption can be reduced. In addition, the predetermined threshold is set as a threshold for controlling devices and the like controlled by the measured value measured by the sensor device, so that this can contribute to appropriate control of the devices and the like.

The sensor management system according to one or more embodiments of the present invention is configured as described above, and the server device may include threshold determination means that determines the predetermined threshold on the basis of the measured value history record, wherein the server communication control means may control the server communication unit so as to transmit the determined predetermined threshold to the sensor device.

According to the configuration, the server device determines the predetermined threshold on the basis of the measured value history record which is multiple measured values in the past. Therefore, the predetermined threshold is optimized. For this reason, when the predetermined threshold is a threshold for controlling devices and the like controlled by the measured value measured by the sensor device, the number of controls of the devices and the like can be reduced.

The sensor management system according to one or more embodiments of the present invention is configured as described above, and the server device may include environment control means that changes measurement environment of the measurement subject when a current measured value of the measurement subject becomes more than a predetermined threshold so that a measured value of the measurement subject becomes not more than the predetermined management value, wherein the threshold determination means determines, as the predetermined threshold, a value obtained by subtracting, from the predetermined management value, the maximum amount of the measured value changing after the environment control means changes the measurement environment, obtained from the measured value history record.

According to the configuration, the predetermined threshold is determined as the value obtained by subtracting, from the predetermined management value, the maximum amount of the measured value changing after the environment control means changes the measurement environment, obtained from the measured value history record. As described above, the predetermined threshold is determined not based on experience of the user but is determined based on the measured value history record, so that the number of the controls for changing the measurement environment of the measurement subject can be reduced. Even if the measured value changes the maximum amount by the time of the next measurement, the predetermined management value is not arrived at, and therefore, the measurement environment of the measurement subject does not become more than the predetermined management value or become less than the predetermined management value.

The sensor management system according to one or more embodiments of the present invention is configured as described above, and the server device may include environment control means that changes measurement environment of the measurement subject when a current measured value of the measurement subject becomes more than a predetermined threshold so that a measured value of the measurement subject becomes not more than the predetermined management value, wherein the threshold determination means may obtain a first value obtained by subtracting, from the predetermined management value, the maximum amount of the measured value changing after the environment control means changes the measurement environment, obtained from the measured value history record, and further, may determine, as the predetermined threshold, a second value obtained by subtracting, from the first value, the maximum amount of change of the measured value at the minimum time interval at which the sensor device can measure, obtained from the measured value history record.

According to the configuration, the predetermined threshold is determined as follows: the maximum amount of the measured value changing after the measurement environment is changed obtained from the measured value history record is subtracted from the predetermined management value, and further, the predetermined threshold is determined as a value obtained by subtracting the maximum amount of change of the measured value at the minimum time interval at which the sensor device can measure.

Therefore, the management value is not arrived at, and the number of controls of the devices and the like can be reduced more appropriately.

A method for controlling a sensor device according to one or more embodiments of the present invention includes a difference calculation step for calculating the difference between a predetermined threshold and a current measured value measured by a sensor unit that measures a measurement subject, a minimum time calculation step for calculating the minimum arrival time that is the minimum time for the measurement subject to arrive at the predetermined threshold from the current measured value on the basis of the calculated difference and the maximum amount of change of the measured value with respect to elapsed time based on a plurality of measured value history records obtained by measuring the measurement subject, and a determination step for determining a measurement time interval of the sensor device from whichever time is the greater of the calculated minimum arrival time and the minimum time interval at which the sensor device can measure.

According to the method, the same advantages as those of the sensor device are achieved, and on the basis of the difference between the predetermined threshold and the current measured value of the sensor device and the maximum amount of change of the measured value with respect to elapsed time on the basis of the measured value history record which is multiple measured values in the past, the measurement time interval can be changed and the frequency of the measurement can be optimized. Therefore, useless measurement can be eliminated, and the power consumption can be reduced. In addition, the predetermined threshold is set as a threshold for controlling devices and the like controlled by the measured value measured by the sensor device, so that this can contribute to appropriate control of the devices and the like.

A method for controlling a sensor device according to one or more embodiments of the present invention includes a difference calculation step for calculating the difference between a predetermined threshold and a current measured value measured by a sensor unit that measures a measurement subject, a minimum time calculation step for calculating the minimum arrival time that is the minimum time for the measurement subject to arrive at the predetermined threshold from the current measured value on the basis of the calculated difference and the maximum amount of change of the measured value with respect to elapsed time based on a plurality of measured value history records obtained by measuring the measurement subject, a measurement time determination step for determining the time of the next measurement of the measurement subject from whichever time is the greater of the calculated minimum arrival time and the minimum time interval at which the sensor device can measure, and a sensor control step for controlling the sensor device in a manner so as to measure the measurement subject at the determined time.

According to the method, the same advantages as those of the sensor device are achieved, and on the basis of the difference between the predetermined threshold and the current measured value of the sensor device and the maximum amount of change of the measured value with respect to elapsed time on the basis of the measured value history record which is multiple measured values in the past, the measurement frequency can be changed, and the frequency of the measurement can be optimized. Therefore, useless measurement can be eliminated, and the power consumption can be reduced. In addition, the predetermined threshold is set as a threshold for controlling devices and the like controlled by the measured value measured by the sensor device, so that this can contribute to appropriate control of the devices and the like.

It should be noted that the sensor device according to one or more embodiments of the present invention may be achieved with a computer, and in this case, the scope of the present invention also includes a program achieving the sensor device using a computer by causing the computer to operate as each of the means and a computer-readable recording medium having the control program recorded therein.

According to the configuration, the above actions and effects as those of the sensor device can be achieved by causing a computer to read and execute the program.

The present invention is not limited to each embodiment explained above. The present invention can be changed in various manners. That is, the technical scope of the present invention also includes embodiments obtained by combining technical means changed as necessary without deviating from the scope of the present invention.

One or more embodiments of the present invention is useful for the sensor and the sensor management system for measuring a measurement subject transiting with gradual change, and can be used for control of environment where measurement data transit with gradual change.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF SYMBOLS 1 sensor device
2 server device
11 power supply unit
12 sensor unit
13 sensor control unit (sensor control means)
14 sensor communication unit
15 measurement data recording unit
16 operation-setting-parameter recording unit (change amount recording unit)
17 input unit
21 server control unit
22 server communication unit
23 measurement data history record recording unit
100 sensor management system
131 operation setting management unit
132 measurement time determination unit (measurement time determination means)
133 sensor communication control unit (sensor communication control means)
211 change amount update unit (change amount update means)
212 threshold determination unit (threshold determination means)
213 server communication control unit (server communication control means)
1311 difference calculation unit (difference calculation means)
1312 minimum time calculation unit (minimum time calculation means)

The invention claimed is:

1. A sensor device comprising:
a sensor unit that measures a measurement subject;
a difference calculation unit that calculates a difference between a predetermined threshold value and a current measured value of the measurement subject, measured at a current time by the sensor unit;
a change amount recording unit that records a maximum amount of change among a plurality of measured values of the measurement subject;
a minimum time calculation unit that calculates a minimum arrival time for the measurement subject to arrive at the predetermined threshold value from the current measured value based on the calculated difference and the recorded maximum amount of change;
a measurement time determination unit that determines a time of a next measurement of the measurement subject as the calculated minimum arrival time from the current time when the calculated minimum arrival time is more than a device minimum time interval at which the sensor device can measure the measurement subject, and as the device minimum time interval from the current time when the device minimum time interval is more than the calculated minimum arrival time; and
a sensor control unit that controls the sensor unit so as to measure the measurement subject at the determined time of the next measurement, to reduce power consumption associated with the measurement.

2. The sensor device according to claim 1, wherein
the plurality of measured values are measured at a plurality of elapsed times, respectively, and
the minimum arrival time is a shortest elapsed time of the plurality of elapsed times for the measurement subject to arrive at the predetermined threshold value from the current measured value based on the maximum amount of change and the calculated difference.

3. The sensor device according to claim 1, wherein
the plurality of measured values are measured per unit time,
the minimum arrival time is a quotient obtained by dividing the calculated difference by the maximum amount of change per unit time.

4. The sensor device according to claim 1, further comprising an input unit that inputs the predetermined threshold value.

5. The sensor device according to claim 1, wherein when the calculated minimum arrival time is more than the device minimum time interval the next measurement is performed in a time less than the calculated minimum arrival time from the current time.

6. The sensor device according to claim 1, further comprising:
a selection unit that selects the predetermined threshold value at the current time from a plurality of predetermined threshold values; and a threshold correspondence information recording unit that records threshold correspondence between the currently selected predetermined threshold value and a next predetermined threshold values to be selected subsequently, wherein, when the currently selected predetermined threshold value exists between a previous measured value and the current measured value, the selection unit extracts the next predetermined threshold value as based on the currently selected predetermined threshold value and the threshold correspondence information, and updates the next predetermined threshold value as the currently selected predetermined threshold value, and wherein the difference calculation unit and the minimum time calculation unit use the currently selected predetermined threshold value for calculating the difference and the maximum amount of change.

7. A sensor management system comprising:
the sensor device according to claim 1; and
a server device for managing the sensor device,
wherein the sensor device further includes:
 a sensor communication unit that communicates with the server device; and
 a sensor communication control unit that controls the sensor communication unit so as to transmit the current measured value to the server device, and
the server device includes:
 a server communication unit that communicates with the sensor device;
 a change amount update unit that generates a measured value history record from the plurality of measured values received from the sensor device and updates the maximum amount of change based on the measured value history record; and
 a server communication control unit that controls the server communication unit so as to transmit the updated maximum amount of change to the sensor device.

8. The sensor management system according to claim 7, wherein
the server device includes a threshold determination unit that determines the predetermined threshold value based on the measured value history record,
the server communication control unit controls the server communication unit so as to transmit the determined predetermined threshold value to the sensor device.

9. The sensor management system according to claim 8, wherein
the server device includes environment control unit that changes measurement environment of the measurement subject when the current measured value of the measurement subject becomes more than the predetermined threshold value so that the current measured value of the measurement subject becomes not more than a predetermined management value, and
the threshold determination unit determines, as the predetermined threshold value, a value obtained by subtracting, from the predetermined management value, the maximum amount changing after the environment control unit changes the measurement environment, obtained from the measured value history record.

10. The sensor management system according to claim 8, wherein
the server device includes environment control unit that changes measurement environment of the measurement subject when the current measured value of the measurement subject becomes more than the predetermined threshold value so that the current measured value of the measurement subject becomes not more than a predetermined management value, and
the threshold determination unit obtains a first value obtained by subtracting, from the predetermined management value, the maximum amount changing after the environment control unit changes the measurement environment, obtained from the measured value history record, and further, determines, as the predetermined threshold value, a second value obtained by subtracting, from the first value, the maximum amount of change at the device minimum time interval, obtained from the measured value history record.

11. A program stored on a non-transitory computer readable medium that causes a computer to function as each of the units provided in the sensor device according to claim 1.

12. A non-transitory computer-readable recording medium recording the program according to claim 11.

13. A method for controlling a sensor device, comprising:
a measurement step for measuring a measurement subject by a sensor unit;
a difference calculation step of calculating a difference between a predetermined threshold value and a current measured value of the measurement subject, measured at a current time by the sensor unit;
a change amount recording step for recording a maximum amount of change among a plurality of measured values of the measurement subject, measured over each of a plurality of elapsed times;
a minimum time calculation step of calculating a minimum arrival time for the measurement subject to arrive at the predetermined threshold value from the current measured value based on the calculated difference and the recorded maximum amount of change;
a measurement time determination step of determining a time of a next measurement of the measurement subject as the calculated minimum arrival time from the current time when the calculated minimum arrival time is more than a device minimum time interval at which the sensor device can measure the measurement subject, and as the device minimum time interval from the current time when the device minimum time interval is more than the calculated minimum arrival time; and
a sensor control step of controlling the sensor unit so as to measure the measurement subject at the determined time of the next measurement, to reduce power consumption associated with the measurement.

* * * * *